June 29, 1965   R. C. SKLENKA   3,191,888
AIRCRAFT HAVING FORWARD AND AFT PROPULSION MEANS
Filed Feb. 25, 1963
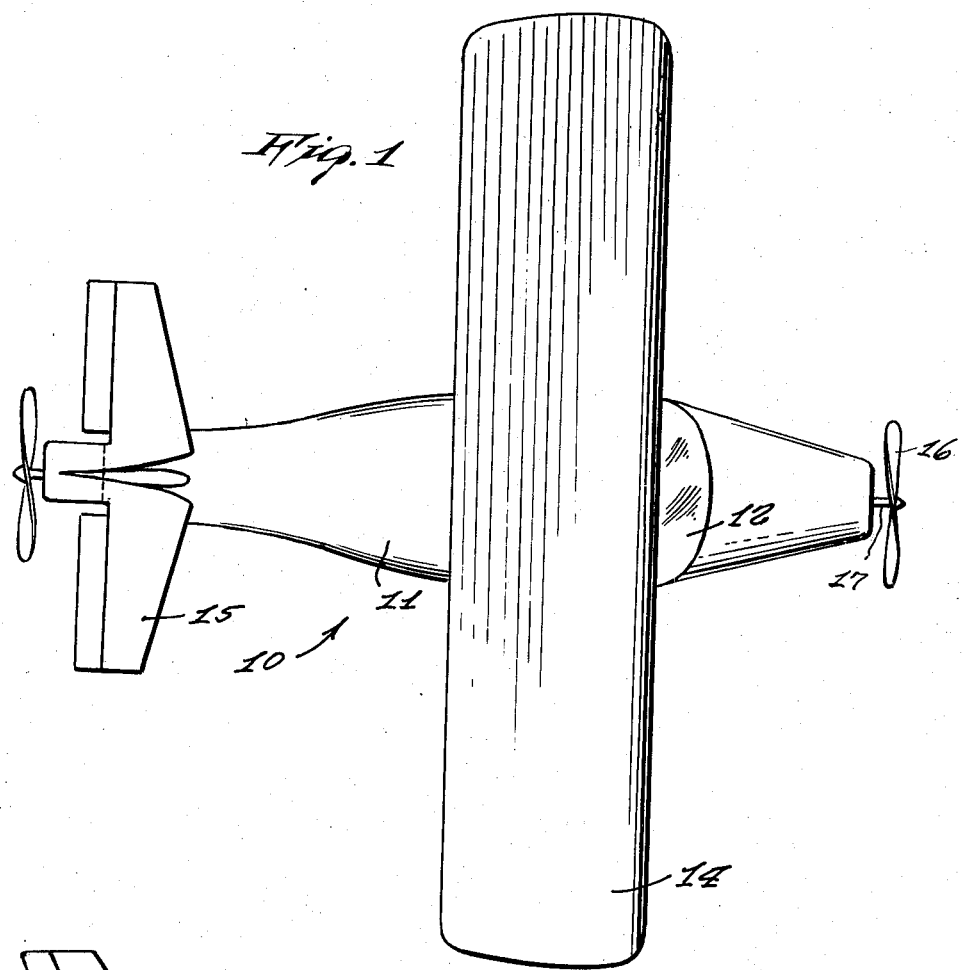
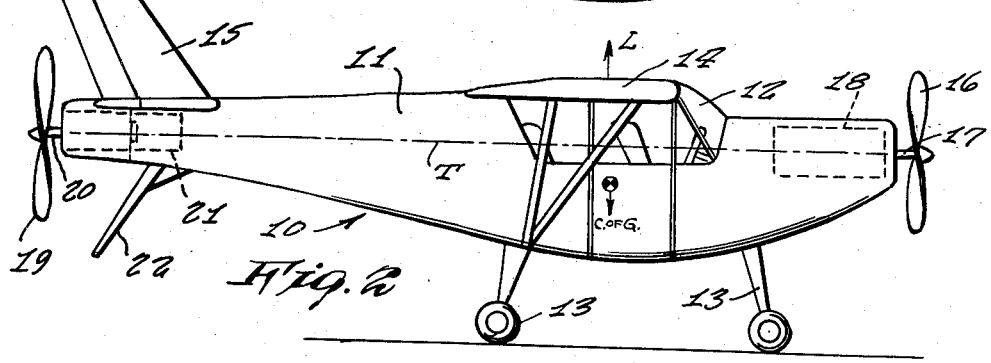
INVENTOR.
ROBERT C. SKLENKA
BY
Carl Miller
ATTORNEY 3,191,888
AIRCRAFT HAVING FORWARD AND AFT
PROPULSION MEANS
Robert C. Sklenka, 12351 Rock Garden Lane,
Miami 50, Fla.
Filed Feb. 25, 1963, Ser. No. 260,522
1 Claim. (Cl. 244—55)

This invention generally relates to heavier than air craft and more particularly to improvements to such vehicles having propellers driven by internal combustion engines.

At the present time, aircraft utilizing such propulsion means is primarily of the private and executive classes. Many accidents of aircraft in these classes have been attributed to engine failure wherein the pilot has been unable to maintain the craft airborne until a suitable setdown area has been located.

It is a fact that "frontal area" in any form on an aircraft adds drag and reduces speed requiring additional power to overcome it. Accordingly, the minimum drag (no frontal area) location of the aft engine and the smaller size of the forward engine will, combined with drag decrease from lesser torque effect from opposite rotating propellers, produce performance equal to a single engine design. In addition there will be the desirable safety feature of two engine reliability.

Accordingly, an object of this invention is a decrease in engine "frontal area" drag.

Another object of this invention is to divide the total horsepower into two equal parts and locate each part independently at the fore and aft positions of the fuselage.

Another object of this invention is to provide propulsion for the aircraft so that all power will not be completely lost due to a single power failure.

Another object of this invention is to provide propulsion for an aircraft from multiple sources which will maintain the aircraft airborne in emergency conditions where there is partial failure.

Another object of this invention is to distribute weight of aircraft propulsion means more advantageously along the longitudinal axis of an aircraft.

The foregoing and other objects and advantages will be more completely understood by referring to the following description and the accompanying drawings wherein:

FIGURE 1 is a plan view of an aircraft made in accordance with the present invention, FIGURE 2 is a side view of the novel aircraft of FIGURE 1.

Referring now to the drawings, a personal or private type aircraft 10 has a fuselage 11 with a cockpit area 12 and is supported on a tricycle type landing gear 13. Aircraft 10 is a high wing monoplane having a single main plane or wing 14 connected at the top of the fuselage 11 to produce lift L which is substantially coincident along the longitudinal axis of the aircraft with the center of gravity C. of G. as indicated in FIGURE 2.

Aircraft 10 has the usual tail surfaces 15 which provide stability and control in yaw and in elevation. The normal propeller 16 is mounted on a shaft 17 at the front end of the fuselage 11 and is driven by an engine 18 located in the nacelle portion of fuselage 11 that is forward of the cockpit area 12. However, in accordance with the present invention, the tail portion of fuselage 11 is enlarged or modified to house a second engine 21 for driving a second propeller 19 rotatable on a shaft 20. To protect the pusher propeller 19, a drag leg 22 is disposed beneath the rear portion of the fuselage 11 and contacts the ground if a pilot lands the aircraft in an abnormally tail low attitude.

Propeller 16 mounted on shaft 17 and driven by engine 18 provides a tractor type propulsion unit while propeller 19 mounted on shaft 20 and driven in opposite rotation by engine 21 provides a pusher type propulsion unit. Both the tractor and the pusher type propulsion units provide driving impetus along the thrust axis T which generally coincides with the longitudinal axis of the aircraft 10.

The opposite rotation of the two propellers will have a neutralizing effect on the overall torque forces acting on the aircraft thereby reducing drag and improving control response.

Aircraft 10 could be operated as either a tractor or a pusher type craft with only one engine 18 or 21 operating to drive either propeller 16 or 19, with the other propeller stopped. However, it will be readily realized that this would be relatively uneconomical. Thus, it is preferred that both units operate under normal conditions which permits reducing the required power of each of the engines 18 and 21, and permits reducing the size of the propellers 16 and 19. Therefore, each engine and its propeller 18 and 16, and 21 and 19 is designed to maintain the aircraft 10 in flight under normal operation at reduced air speed.

While certain novel features of my invention have been shown and described and are pointed out in the annexed claim, it will be understood that various omissions, substitutions and changes in the forms and details of the device illustrated and in its operation can be made by those skilled in the art without departing from the spirit of the invention.

Having thus described my invention, what I claim as new and desire to secure by Letters Patent is:

An airplane of the high wing monoplane type having a single wing connected at the top of the fuselage and directly above the cockpit area thereof and a single upper tail fin at the rear of said fuselage comprising:
(a) a forward tractor propeller,
(b) an engine mounted within the fuselage forwardly of the cockpit area for driving said tractor propeller in one direction,
(c) a rear pusher propeller,
(d) an engine mounted within the fuselage rearwardly of the cockpit area and immediately adjacent the rear end of the fuselage for driving said pusher propeller in a direction opposite to that of the tractor propeller,
(e) the thrust axis of both propellers being coaxial and coinciding along the longitudinal axis of the airplane located above the center of gravity thereof, and
(f) a rearwardly inclined drag leg secured at its upper end to the underside of the fuselage at the rear end thereof forwardly of the pusher propeller, operative to prevent said pusher propeller from engaging the ground on landing of the airplane,
(g) each engine and the propeller driven thereby, being operative to provide sufficient thrust under normal operating conditions to maintain the airplane airborne when the other engine is not operating.

References Cited by the Examiner
UNITED STATES PATENTS
1,858,761   5/32   Bellanca _____ 244—55

FOREIGN PATENTS
507,714   6/39   Great Britain.
516,013   12/39  Great Britain.

MILTON BUCHLER, Primary Examiner.
ANDREW H. FARRELL, Examiner.